US008175661B2

(12) United States Patent
Park et al.

(10) Patent No.: US 8,175,661 B2
(45) Date of Patent: May 8, 2012

(54) DEVICE, SYSTEM, AND METHOD OF POWER SAVING IN WIRELESS NETWORK

(75) Inventors: Minyoung Park, Portland, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1121 days.

(21) Appl. No.: 11/849,313

(22) Filed: Sep. 3, 2007

(65) Prior Publication Data

US 2009/0061799 A1    Mar. 5, 2009

(51) Int. Cl.
*H04M 1/00* (2006.01)
(52) U.S. Cl. .............. 455/574; 455/522; 455/127.1; 455/127.5; 455/161.3
(58) Field of Classification Search .............. 370/311; 455/522, 574, 127.1, 161.3
See application file for complete search history.

(56) References Cited

U.S. PATENT DOCUMENTS

| | | | |
|---|---|---|---|
| 7,245,592 B2 * | 7/2007 | Soomro et al. | 370/311 |
| 7,295,542 B2 * | 11/2007 | Xu | 370/338 |
| 7,372,855 B2 * | 5/2008 | Kandala | 370/394 |
| 7,466,981 B1 * | 12/2008 | Abdelhamid et al. | 455/438 |
| 7,519,032 B2 * | 4/2009 | Soomro et al. | 370/338 |
| 7,783,284 B1 * | 8/2010 | Laux et al. | 455/418 |
| 2007/0127427 A1 * | 6/2007 | Tanaka | 370/338 |
| 2007/0258397 A1 * | 11/2007 | Ho et al. | 370/328 |
| 2009/0061799 A1 * | 3/2009 | Park et al. | 455/127.5 |

OTHER PUBLICATIONS

IEEE P802.11r / D 9.0, Draft Standard for Information Technology—Telecommunications and information exchange between systems—Local and metropolitan area networks—Specific requirements, Part 11: Wireless LAN Medium Access Control (MAC) and Physical Layer (PHY) specifications Amendment 2: Fast BSS Transition, Jan. 2008, pp. 1-124.
IEEE P802.11k / D 13.0, Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 1: Radio Resource Measurement of Wireless LANs, Mar. 2008, pp. 1-238.
IEEE P802.21/D10.0, Draft Standard for Local and Metropolitan Area Networks: Media Independent Handover Services, Apr. 2008, pp. 1-292.

* cited by examiner

*Primary Examiner* — Temesgh Ghebretinsae
*Assistant Examiner* — Richard Chan
(74) *Attorney, Agent, or Firm* — Shichrur & Co.

(57) ABSTRACT

Device, system, and method of power saving in wireless network. For example, a method includes: receiving from a wireless access point a wireless communication signal indicting wireless network load information represented as a value of a parameter in a Basic Service Set load information element, wherein the parameter comprises a parameter selected from a group consisting of: a station count parameter, a channel utilization ratio parameter, an available admission control parameter, a network congestion parameter, a transmission power suggestion parameter, a reception power suggestion parameter, and a late adaptation suggestion parameter; and modifying a power consumption mode of a communication unit of a wireless communication device based on said parameter.

16 Claims, 2 Drawing Sheets

DEVICE, SYSTEM, AND METHOD OF POWER SAVING IN WIRELESS NETWORK

BACKGROUND

A wireless communication system may include a wireless communication device able to communicate with a wireless Access Point (AP). The wireless communication device may include a power source, for example, a battery, which may provide power to components of the wireless communication device, e.g., a processor, a transmitter, a receiver, etc.

Wireless communications by the wireless communication device may consume significant power resources. In order to reduce the power consumption, the user of the wireless communication device may be required to manually turn off the wireless communication device from time to time, and/or to avoid utilization of wireless communications from time to time.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
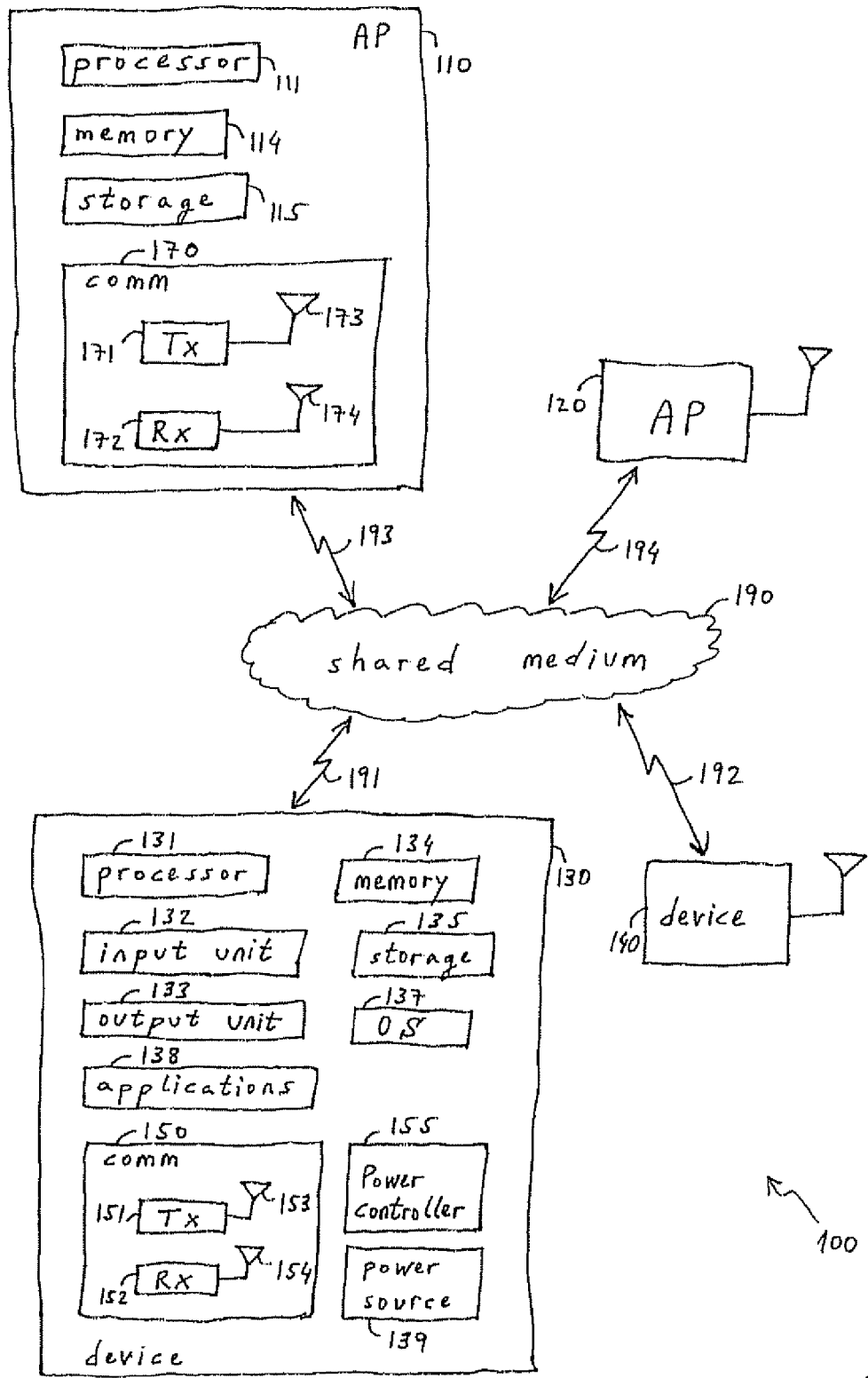
FIG. 1 is a schematic block diagram illustration of a wireless communication system in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-boar-d device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2 G, 2.5 G, 3 G, 3.5 G, or the like. Embodiments of the invention may be used in various other devices, systems and/or networks.

FIG. 1 schematically illustrates a block diagram of a wireless communication system 100 in accordance with some demonstrative embodiments of the invention. System 100 may include, one or more wireless communication devices, for example, wireless communication devices 130 and 140, as well as one or more wireless Access Points (APs), for example, APs 110 and 120. The components of system 100 may communicate using a shared medium 190, for example, using wireless links 191-194.

Device 130 and/or device 140 may be or may include, for example, a mobile phone, a cellular phone, a handheld device, a computing device, a computer, a Personal Computer (PC), a server computer, a client/server system, a mobile computer, a portable computer, a laptop computer, a notebook computer, a tablet computer, a network of multiple inter-connected devices, or the like.

Device 130 may include, for example, a processor 131, an input unit 132, an output unit 133, a memory unit 134, a storage unit 135, a communication unit 150, and a power source 139. Device 130 may optionally include other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 executes instructions, for example, of an Operating System (OS) 137 of device 130 or of one or more applications 138.

Input Unit 112 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM rive, a Digital Versatile Disk (DVD) drive, or other suitable removable or non-removable storage units. Memory unit 114 and/or storage unit 115, for example, store data processed by device 130.

Communication unit 150 includes, for example, a wireless transceiver, a wireless modem, a wireless Network Interface Card (NIC), or the like. For example, communication unit 150 includes a transmitter 151 and a receiver 152.

Transmitter 151 includes, for example, a wireless Radio Frequency (RF) transmitter able to transmit wireless RF signals, blocks, frames, transmission streams, packets, messages and/or data, e.g., through an antenna 153.

Receiver 152 includes, for example, a wireless Radio Frequency (RF) receiver able to receive wireless RF signals, blocks, frames, transmission streams, packets, messages and/or data, e.g., through an antenna 154.

Optionally, transmitter 151 and receiver 152 may be implemented using a transceiver, a transmitter-receiver, or other suitable components. Optionally, antenna 153 and antenna 154 may be implemented using a common antenna, a common set of multiple antennas, or other suitable component(s). For example, antenna 153 and/or antenna 154 may include an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

Power source 139 includes, for example, one or more batteries, rechargeable batteries, non-rechargeable batteries, replaceable batteries, disposable or non-replaceable batteries, internal batteries, external batteries, or other power cells able to provide electric power to one or more components of device 130.

Optionally, a power controller 155 is associated with one or more components of device 130, and is able to modify operational properties of device 130 (or components thereof) based on power-related algorithms or criteria. For example, power controller 155 is able to turn off, turn on, enable, disable, connect and/or disconnect one or more components of device 130; is able to command device 130 or components thereof to go into a power-saving mode, a "sleep" mode, a "standby" mode, a semi-operational mode, a partially-operational mode, a reduced-power mode, a power efficiency mode, or other power consumption modes; is able to otherwise modify power consumption mode of device 130 or components thereof; and is able to switch the device 130 (or components thereof) from operating in a first power consumption mode to operating in a second power consumption mode. In some embodiments, in order to reduce power consumption and/or in order to go into "sleep mode", the power controller 155 may selectively command the communication unit 150 and/or the transmitter 153 and/or the receiver 152 to go into "sleep mode" or reduced-power mode or be disabled or disactivated, of to "walk up" or activate or enable, or to otherwise modify their power consumption mode. In some embodiments, power controller 155 (or another suitable unit of device 130) may implement one or more power management algorithms or power saving algorithms described herein.

In some embodiments, some or all of the components of device 130 may be enclosed in a common housing, packaging, or, the like, and may be interconnected or operably associated using one or more wired or wireless links. In other embodiments, components of device 130 may be distributed among multiple or separate devices or locations.

AP 110 and/or AP 120 may be or may include, for example, a wireless AP, a wireless base station, a wireless controller, a wireless router, a component of an ad-hoc network operating as an AP or a router, an AP of a Basic Service Set (BSS), a device operating as AP in an Independent BSS (IBSS), an AP of a device able to connect among multiple wireless communication devices, a device able to form a wireless communication network, a device able to relay among wireless communication devices, or the like.

AP 110 may include, for example, a processor 111, a memory unit 114, a storage unit 115, and a communication unit 170. The communication unit 170 may include, for example, a transmitter 171 associated with an antenna 173, and a receiver 172 associated with an antenna 174.

Device 140 may include components similar, in properties and/or in functionality, to the components of device 130 AP 120 may include components similar, in properties and/or in functionality, to the components of AP 110.

In some embodiments, device 130 may be an Always On Always Connected (AOAC) device, which maintains or attempts to maintain one or more wireless network links, and/or may be substantially continuously connected to one or more wireless networks. Device 130 may operate to achieve network resource acquisition, while maintaining power efficiency. Accordingly, device 130 may utilize power saving algorithms that utilize network-supplied information.

In some embodiments, device 130 utilizes information external to device 130, namely, externally available information, within its power saving or power management algorithms. For example, power saving or power management algorithms of device 130 may utilize externally available Quality-of-Service (QoS) information, externally available security information, externally available traffic load information, externally available wireless network congestion information, externally available airtime allocation slots information, or the like. Optionally, device 130 may utilize roaming algorithms that take into account externally available information which is advertised as Information Elements (IEs) by AP 110 and/or AP 120. Optionally, device 130 may utilize externally available information in its power saving algorithms for network entry, network leaving, roaming between heterogeneous networks, or the like.

In some embodiments, components of system 100 communicate in accordance with IEEE 802.11 standard. Device 130 is associated with AP 110, which may be "crowded", namely, may serve a significant number of wireless devices. Accordingly, the channel access delay increases, and an increased period of time may be required for device 130 to access the AP 110. The AP 110 advertises network load information, for example, as BSS load information or as QoS BSS (QBSS) load information in accordance with IEEE 802.11e standard. The network load information is advertised by AP 110 through Medium Access Control (MAC) frames, for example, beacon frames and/or probe response frames. The advertised network load information allows device 130 to estimate or to determine the number of stations associated with AP 110, or to otherwise estimate or determine how busy or "crowded" the wireless channel is Based on the advertised network load information, device 130 may determine to roam from AP 110 to neighboring AP 120, which may have a reduced network load, and device 130 may thus achieve increased throughout. Similarly, device 130 may utilize the BSS Load IE advertised in Wi-Fi Alliance Wireless Multimedia (WMM) communication networks.

Although portions of the discussion herein may relate, for demonstrative purposes, to utilization in power saving algorithms of device 130 of network load information advertised by AP 110, embodiments of the invention may optionally include, additionally or alternatively, utilization of other (e.g., more specific) channel information in power saving algorithms of device 130. For example, in some embodiments, device 130 may obtain or gather specific channel information (e.g., from AP 110 and/or from other sources in the wireless network external to device 130), optionally utilizing explicit indications, for example, congestion information, transmission (Tx) power suggestions, reception (Rx) power suggestions, rate adaptation suggestions, or the like. These indications or parameters may optionally be part of a wireless communication standard or protocol, and/or may be delivered or obtained using various suitable mechanisms (e.g., action frames, beacons, probes, a "piggyback" on Acknowledgment (ACK), or the like) sent from AP 110 to device 130, or otherwise advertise by AP 110. Accordingly, the term "network load information" as used herein may optionally include, for example, such additional or alternate indications, parameters or information.

In some embodiments, for example, device 130 may utilize network load information included in IEEE 802.11e QBSS load IE and advertised by AP 110. The IF includes, for example, a station count parameter, indicating the number of wireless stations currently associated with AP 110; a channel utilization parameter, indicating the percentage of time (e.g., normalized to 255) in which AP 110 sensed that the medium is busy; an available admission capacity parameter, indicating a remaining amount of medium time available using explicit admission control; and optionally other suitable parameters.

In some embodiments, device 130 and other components of system 100 utilize a Carrier Sense Multiple Access (CSMA) scheme with Collision Avoidance (CA) (namely, a CSMA/CA scheme) which senses the channel prior to transmission. Accordingly, the channel access delay increases as the network load increases. Therefore, device 130 may use a power-saving algorithm utilizing the QBSS load information and/or other information from the AP 110 infrastructure to properly manage the power consumption of the communication unit 150, since device 150 is required to be "awake" and operational in order to sense the channel.

In some embodiments, device 130 uses a power management scheme that controls the device's 130 "sleep" and "wake-up" behavior based on advertised QBSS load information (and/or other AP 110 channel parameters). For example, based on advertised QBSS load information, device 130 may estimate or determine that the load of AP 110 is high or relatively highs. In such case, if device 130 does not have packets or data that are pending for immediate transmission or reception, device 130 may avoid attempting to access the channel immediately, and instead may go into "sleep mode" or power-saving mode, for example, until the load of the AP 110 (e.g., as advertised by QBSS load information) becomes sufficiently lighter (e.g., lower than a thresold value, denoted Load_Threshold). If the load of AP 110 is high or relatively high for a pre-defined period of time (e.g., denoted T_Threshold), device 130 may attempt to find a neighboring AP (e.g., AP 120) having a lighter load, or may attempt to find a neighboring AP (ergo, AP 120) advertising a power-saving capability as described herein.

In some embodiments, power saving algorithms of device 130 may utilize the advertised reservation information in accordance with IEEE 802.11r standard, e.g., in secure fast roaming. For example, device 130 may utilize a QoS reservation scheme, and AP 110 may advertise a recommendation that device 130 associate with another AP, e.g., with AP 120. The information is advertised, for example, in a "Resource Request Protocol Supported" field in the Mobility Domain IE, or in other suitable fields or IEs. Additionally or alternatively, AP 110 may support transition over-the-air mechanism and/or transition over the Distribution System (DS) mechanism, for transitioning between APs. The transition information is advertised by AP 110, for example, in a "Fast Transition over Air" field or in a "Fast Transition over DS" field in the Mobility Domain IE, or in other suitable fields or IEs. Accordingly, the information advertised by AP 110 may be used by device 130 to conduct AP transition (e.g., from AP 110 to AP 120) using a suitable method, and optionally using the most efficient method at the time of transition.

In some embodiments, for example, if AP 110 advertises a recommendation for device 130 to perform QoS reservations, device 130 may determine that AP 110 is heavily loaded. This determination may be used in a power saving scheme of device 130; for example, device 130 may utilize this information when performing a method of power saving, e.g., the method described herein with reference to FIG. 2.

In some embodiments, device 130 may be able to perform over-the-DS transitions (which utilize the currently-associated AP 110), thereby allowing device 130 to roam as it changes its operation between "wake-tip" and "sleep" cycles. When AP 110 advertises over-the-DS support, device 130 need not perform resource-consuming channel switch operations while transitioning. Instead, device 130 may perform a fast transitioning protocol (e.g., in accordance with IEEE 802.11r), or at least a significant portion thereof, without necessarily associating with the target AP 120 while roaming. Therefore, device 130 (e.g., implemented as an AOAC device) may be adapted to substantially continuously execute at least a partial IEEE 802.11r fast transitioning protocol with one or more neighboring APs, thereby allowing device 130, when required, to rapidly complete the IEEE 802.11r fast transitioning protocol with one of the neighboring APs and reduce inline latency. Accordingly, once device 130 detects that AP 110 supports fast transitioning (e.g., based on the information advertised by AP 110), device 130 may perform partial IEEE 802.11r fast transitioning protocols with neighboring AP 120 in parallel to sending data frames; this may allow the device 130 to have longer "sleep mode" periods, in which device 130 reduces power consumption, as device 130 need no frequently go into "wake mode" in order to conduct partial IEEE 802.11r exchanges.

In some embodiments, for example, device 130 is associated with AP 110, which may be able to sending to device 130 information about neighboring APs (e.g., information about AP 120). This information may be advertised by AP 110 in a suitable field or IF, for example, in accordance with IEEE 802.11k standard, e.g., a "Neighbor Report" IE, which may optionally include QBSS load information; or in accordance with another wireless communication standard or protocol (e.g., an amendment to IEEE 802.11 standard) which may include additional AP channel information. The advertised information may be used by device 130 to reduce its active scanning for detection of neighboring AP and/or AP loads; device 130 may avoid at least some of the AP scanning, and may thus further consume power.

In some embodiments, device 130 is able to manage its power consumption not only based its internal information, but further based on external information advertised by AP 110, e.g., traffic and load characteristics of the network. In some embodiments, the power consumption of device 130 is reduced by increasing the device's sleep time when the AP 110 is heavily loaded. In some embodiments, information advertised by AP 110 is used in order to make power-saving decisions by device 130, and in order to save unnecessary power consumption due to channel access delay. In some embodiments, for example, transmitter 151 of device 130 may temporarily retire due the channel access delay. In some embodiments, device 130 may modify its sleep/wake-up behavior, for example, by avoiding access to the channel and/or by going into "sleep mode" when AP 110 is heavily loaded.

Figure 2:
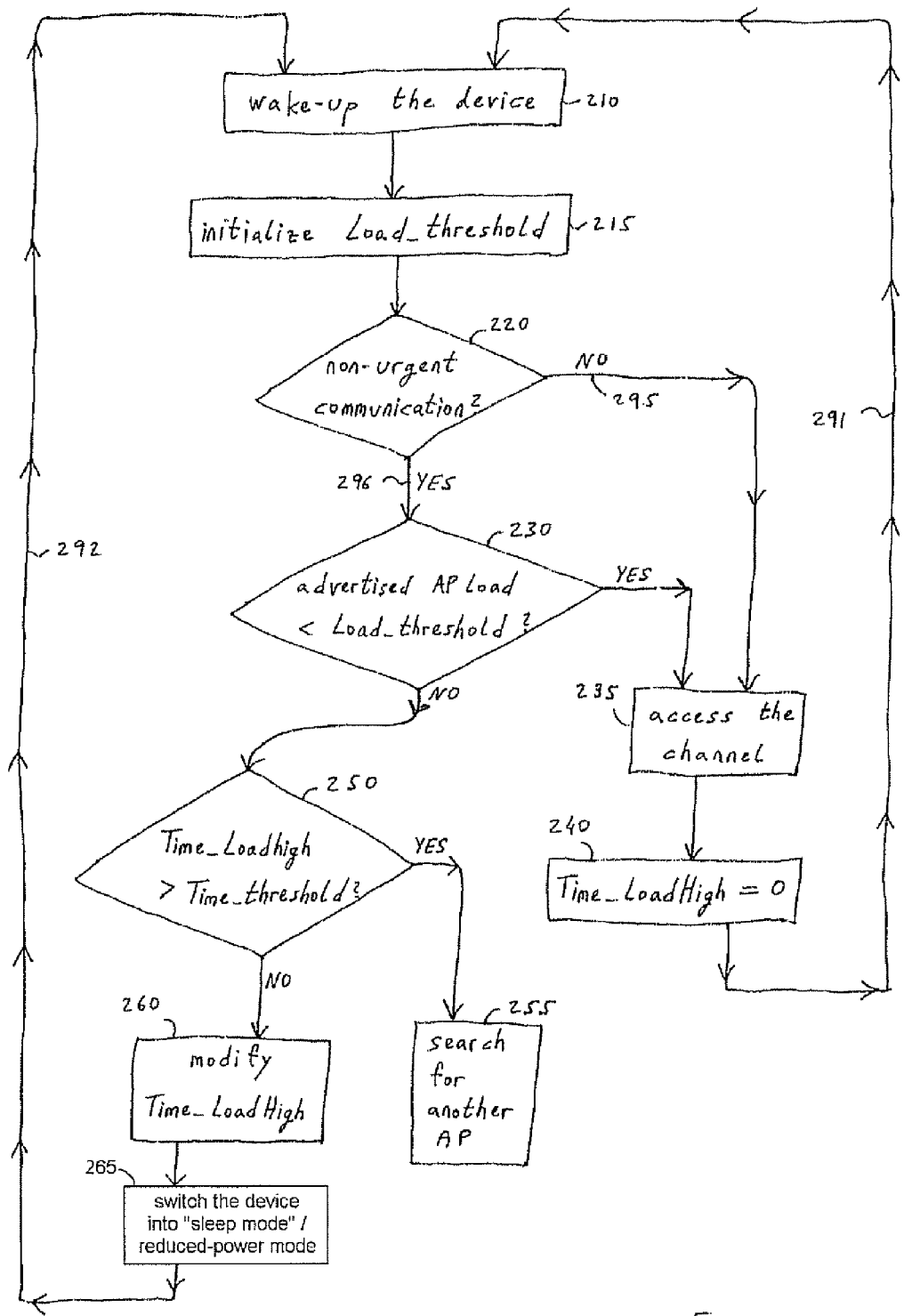
FIG. 2 is a schematic flow-chart of a method of power saving in wireless network ill accordance with a demonstrative embodiment of the invention.

FIG. 2 is a schematic flow-chart of a method of power saving in wireless network in accordance with some demonstrative embodiments of the invention, Operations of the method may be used, for example, by system 100 of FIG. 1, by device 130 of FIG. 1, and/or by other suitable units, devices and/or systems.

In some embodiments, the method may include, for example, waking up a wireless communication device or a component thereof (egg, switching from a "sleep mode" or a reduced-power mode into an "awake mode") in order; to receive QBSS load information (block 210). This may be performed by the wireless communication device, for example, periodically, at pre-defined time intervals, at time intervals corresponding to beacon periods (e.g., at substantially each beacon period), at time intervals corresponding to Delivery Traffic Indication Message (DTIM) periods (e.g., at substantially each DTIM interval), at time intervals corresponding to beacon intervals, or the like.

Once the wireless communication device (or component(s) thereof) wakes Lip, the method may include, for example, initializing a Load_Threshold parameter in the wireless communication device (block 215). The Load_Threshold parameter indicates a threshold value, to which the wireless communication device compares the load information advertised by the AP, in order to determine whether the wireless communication device will transmit a packet or will go into "sleep mode", For example, if the load information advertised by the AP is higher than the Load_Threshold parameter, the wireless communication device will avoid transmitting a packet and will go into "sleep mode"; whereas if the load information advertised by the AP is not higher than the Load_Threshold parameter, the wireless communication device will transmit a packet and will maintain the "awake mode".

In some embodiments, the method may include, for example, determining whether non-urgent communication is pending (block 220), for example, determining whether one or more of the following conditions hold true: the QoS transmission queue(s) of the wireless communication device are empty; and/or there is no urgent data for the wireless communication device to transmit; and/or there is no urgent data for the wireless communication device to receive; and/or data frames may be queued on transmission; and/or no periodic reception is expected, For example, if one or more conditions does not hold true, then an urgent communication is pending or expected, and the wireless communication device is required to access the channel without unnecessary delay. Other suitable conditions or criteria may be used to determine whether or not urgent communication is pending.

If none of the conditions of block 220 holds true, then the method may proceed with the operations of block 235 and onward (as indicated by arrow 295). In contrast, if one or more of the conditions of block 220 holds true, then the method may proceed with the operations of block 230 and onward (as indicated by arrow 296).

If one or more of the conditions of block 220 holds true, the method may include determining whether the QBSS load advertised by the AP is smaller than the Load_Threshold parameter (block 230).

If the QBSS load advertised by the AP is smaller than the Load_Threshold parameter, then the method may include accessing the channel (e.g., by the wireless communication device) (block 235), namely, transmitting data to the AP and/or receiving data from the AP; as well as resetting the value of a Time_LoadHigh parameter (block 240), which indicates the time period in which the load of the AP was higher than the Load_Threshold parameter; and proceeding with the operations of block 210 (as indicated by arrow 291).

In contrast, if the QBSS load advertised by the AP is not smaller than the Load_Threshold parameter, then the method may include determining whether the value of the Time_LoadHigh parameter is greater than the value of a Time_Threshold parameter (block 250), which indicates a threshold value, above which the wireless communication device determines to roam to another AP having a lighter load.

If the value of the Time_LoadHigh parameter is greater than the value of a Time_Threshold parameter, the method may include searching (e.g., by the wireless communication device) for another AP (block 255), for example, an AP having a lighter network load, an AP advertising power-save capabilities, or an AP having other pre-defined properties.

In contrast, if the value of the Time_LoadHigh parameter is not greater than the value of a Time_Threshold parameter, the method may include modifying the value of the Time_LoadHigh parameter (block 260). For example, the value of the Time_LoadHigh parameter may be increased by a beacon period (denoted Time_Beacon), or may be increased by a DTIM period (denoted Time_DTIM). After modifying the value of the Time_LoadHigh parameter, the wireless communication device (or a communication unit thereof, or a transmitter thereof, or another component thereof) may temporarily go into "sleep mode" or reduced-power mode (block 265). The method may then proceed with the operations of block 210 and onward (as indicated by arrow 292).

Other suitable operations may be used, and other suitable orders of operation may be used.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the liken.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
   receiving from a wireless access point a wireless communication signal indicating wireless network load information represented as a value of at least one parameter in a Basic Service Set load information element, wherein the at least one parameter comprises at least one of: a station count parameter, a channel utilization ratio parameter, an available admission control parameter, a network congestion parameter, a transmission power suggestion parameter, a reception power suggestion parameter, and a rate adaptation suggestion parameter;
   modifying a power consumption mode of a communication unit of a wireless communication device based on said parameter; and
   if channel access is delayed for a time period greater than a threshold value, searching for a target access point having a wireless network load lesser than the wireless network load advertised by said wireless access point.

2. The method of claim 1, wherein receiving the wireless communication signal indicating the network load information comprises receiving information included in at least one field of a Mobility Domain information element received from the wireless access point, wherein the field comprises a field selected from a group consisting of: a Resource Request Protocol Supported field, a Fast Transition over Air field, and a Fast Transition over Distribution System field.

3. A method comprising:
   receiving from a wireless access point a wireless communication signal indicating wireless network load information represented as a value of at least one parameter in a Basic Service Set load information element, wherein the at least one parameter includes at least one of: a station count parameter, a channel utilization ratio parameter, an available admission control parameter, a network congestion parameter, a transmission power suggestion parameter, a reception power suggestion parameter, and a rate adaptation suggestion parameter; and
   modifying a power consumption mode of a communication unit of a wireless communication device based on said parameter,
   wherein modifying a power consumption mode comprises modifying the power consumption mode based on information included in at least one field of a Mobility Domain information element received from the wireless access point, wherein the field comprises a field selected from a group consisting of: a Resource Request Protocol Supported field, a Fast Transition over Air field, and a Fast Transition over Distribution System field.

4. The method of claim 3, comprising:
   modifying the power consumption mode based on a recommendation to use a Quality of Service reservation scheme received from the wireless access point.

5. A method comprising:
   receiving from a wireless access point a wireless communication signal indicating wireless network load information represented as a value of at least one parameter in a Basic Service Set load information element, wherein the at least one parameter includes at least one of: a station count parameter, a channel utilization ratio parameter, an available admission control parameter, a network congestion parameter, a transmission power suggestion parameter, a reception power suggestion parameter, and a rate adaptation suggestion parameter;
   modifying a power consumption mode of a communication unit of a wireless communication device based on said parameter;
   performing a portion of a fast transitioning protocol with a target wireless access point; and based on wireless network load information received from the wireless access point, determining to complete the fast transitioning protocol with the target wireless access point.

6. The method of claim 5, comprising:
waking-up the communication unit of the wireless communication device substantially at beacon time intervals; and
receiving the Basic Service Set load information element from the wireless access point.

7. A method comprising:
waking-up a communication unit of a wireless communication device substantially at Delivery Traffic Indication Message time intervals;
receiving Basic Service Set load information from a wireless access point, the Basic Service Set load information indicating wireless network load information represented as a value of at least one parameter in a Basic Service Set load information element, wherein the at least one parameter includes at least one of a station count parameter, a channel utilization ratio parameter, an available admission control parameter, a network congestion parameter, a transmission power suggestion parameter, a reception power suggestion parameter, and a rate adaptation suggestion parameter; and
modifying a power consumption mode of the communication unit of the wireless communication device based on said parameter.

8. The method of claim 7, comprising:
if a wireless network load advertised by the wireless access point is greater than a network load threshold value, modifying the power consumption mode of a transmitter of the communication unit to a reduced-power mode.

9. The method of claim 7, comprising:
if channel access is delayed for a time period greater than a threshold value, searching for a target access point having a wireless network load smaller than the wireless network load advertised by said wireless access point.

10. An apparatus comprising:
a receiver to receive wireless communication signals;
a transmitter to transmit wireless communication signals;
a power controller to activate the receiver at pre-defined time intervals, wherein the pre-defined time intervals correspond to at least one of: beacon time intervals, and Delivery Traffic Indication Message time intervals,
wherein the power controller is to switch the transmitter into a reduced-power mode based on Basic Service Set load information advertised by a wireless access point, and wherein the power controller is to modify a power consumption mode of the transmitter based on information included in at least one field of a Mobility Domain information element received from the wireless access point, wherein the field comprises at least one of: a Resource Request Protocol Supported field, a Fast Transition over Air field, and a Fast Transition over Distribution System field.

11. The apparatus of claim 10, wherein the power controller is to wake-up the transmitter if one or more of the following conditions holds true:
a Quality of Service transmission queue is non-empty, and urgent data is pending for transmission by the transmitter.

12. The apparatus of claim 10, wherein the power controller is to wake-up the receiver if one or more of the following conditions holds true:
a periodic reception is expected, and
urgent data is pending for reception by the transmitter.

13. The apparatus of claim 10, wherein the power controller is to modify a power consumption mode of the transmitter based on a recommendation to use a Quality of Service reservation scheme received from the wireless access point.

14. The apparatus of claim 10, wherein the apparatus comprises a wireless communication station comprising a processor to process wireless communication signals received by the receiver.

15. A method of comprising:
receiving from a wireless access point a wireless communication signal indicating wireless network load information represented as a value of at least one parameter in a Basic Service Set load information element, wherein the at least one parameter comprises at least one of: a station count parameter, a channel utilization ratio parameter, an available admission control parameter, a network congestion parameter, a transmission power suggestion parameter, a reception power suggestion parameter, and a rate adaptation suggestion parameter;
modifying a power consumption mode of a communication unit of a wireless communication device based on said parameter; and
if a wireless network load advertised by the wireless access point is greater than a network load threshold value, modifying the power consumption mode of a transmitter of the communication unit to a reduced-power mode.

16. The method of claim 15, comprising:
modifying the power consumption mode based on a recommendation to use a Quality of Service reservation scheme received from the wireless access point.

* * * * *

UNITED STATES PATENT AND TRADEMARK OFFICE
CERTIFICATE OF CORRECTION

| | | |
|---|---|---|
| PATENT NO. | : 8,175,661 B2 | |
| APPLICATION NO. | : 11/849313 | |
| DATED | : May 8, 2012 | |
| INVENTOR(S) | : Minyoung Park et al. | |

It is certified that error appears in the above-identified patent and that said Letters Patent is hereby corrected as shown below:

On the cover page, item (57), in column 2, in "Abstract", line 3-4, delete "indicting" and insert -- indicating --, therefor.

On the cover page, item (57), in column 2, in "Abstract", line 11, delete "late" and insert -- rate --, therefor.

In column 12, line 27, in claim 15, delete "method of" and insert -- method --, therefor.

Signed and Sealed this
Twenty-first Day of August, 2012

David J. Kappos
*Director of the United States Patent and Trademark Office*